United States Patent [19]
Waters

[11] Patent Number: 6,003,092
[45] Date of Patent: Dec. 14, 1999

[54] SIGNAL TRANSMISSION BETWEEN NETWORKED COMPUTERS

[75] Inventor: John Deryk Waters, Bath, United Kingdom

[73] Assignee: Hewlett-Packard Company, Palo Alto, Calif.

[21] Appl. No.: 08/930,175

[22] Filed: Oct. 9, 1997

[30] Foreign Application Priority Data

Feb. 12, 1996 [EP] European Pat. Off. ............. 96300933

[51] Int. Cl.[6] ....................................................... H04Q 7/00
[52] U.S. Cl. ......................... 709/248; 709/203; 709/200; 709/208; 709/225; 342/350
[58] Field of Search .................... 395/200.68, 200.53, 395/200.83; 709/203, 200, 208, 225, 248; 342/350

[56] References Cited

U.S. PATENT DOCUMENTS

| | | | |
|---|---|---|---|
| 5,218,356 | 6/1993 | Knapp | 342/250 |
| 5,339,316 | 8/1994 | Diepstraten | 370/85.13 |
| 5,487,069 | 1/1996 | O'Sullivan et al. | 370/94.3 |
| 5,822,361 | 10/1998 | Nakamura et al. | 375/202 |
| 5,828,663 | 10/1998 | Ikegami | 370/347 |
| 5,852,405 | 12/1998 | Yoneda et al. | 340/825.02 |

*Primary Examiner*—Zarni Maung
*Assistant Examiner*—Saleh Najjar

[57] ABSTRACT

In a computer network of a base station and one or more remote units, data transmission from the base station to the or each remote unit is by way of a wireless (e.g. infrared) signal, and by way of a radio signal in the other direction. Infra-red receivers can be used in the remote units which are cheap and have low power consumption compared with radio receivers, and radio transmitters can be used in the remote units which have low power consumption compared with infra-red transmitters. This therefore facilitates the provision of cheap, battery-powered remote units. The wireless signal is used to send instructions to control selection by each remote unit of a transmission channel for its radio signals.

13 Claims, 2 Drawing Sheets

SIGNAL TRANSMISSION BETWEEN NETWORKED COMPUTERS

TECHNICAL FIELD

The present invention relates to signal transmission between networked computers.

BACKGROUND ART

A conventional form of computer network comprises: a base computer; one or more (and often many) user computers; and a bidirectional communications link between the base computer and the user computer(s). In such a conventional network, the communications links are typically provided by wire connections, such as co-axial cable or unshielded twisted pairs.

The present invention was originally conceived in connection with the networking of computers in a classroom, although it does have many other applications. In such an application, perhaps ten, twenty or thirty students would each have a user computer connected to a base computer, for example a file server. A considerable amount of cabling would therefore be required, at significant cost. Also, in order to be rugged, a large proportion of the wiring would need to be permanently installed, for example in trunking or with cable clips, and this means that the siting of user computers in the classroom is not as flexible as would be desired. In order to deal with this problem, the present invention adopts a wireless approach to the networking of computers, but that in itself presents other problems.

DISCLOSURE OF INVENTION

According to one aspect of this invention, there is provided a computer network comprising a base computer, at least one user computer and a bidirectional communications link between the base computer and the or each user computer, wherein the link from the base computer to the or each user computer is by way of a wireless signal and the link from the or each user computer to the base computer is by way of a radio signal, and wherein the or each user computer is operable to transmit on any of a plurality of radio channels, the base computer is operable to transmit instructions via said wireless signal to the user computer(s) regarding the channel to be used, and the or each user computer is operable to select one of the transmission channels in accordance with the received instructions.

Accordingly, the base computer can control the transmission channels of the user computer(s), for example in a pseudo-random manner in order to comply with radio transmission regulations, and for example so as to avoid channels which are currently subject to interference. Alternatively, the base computer may be operable to transmit with a data rate which is variable. The or each user computer can then select one of the transmission channels in accordance with the data rate of the received wireless signal. This has an advantage over the first alternative in which the instructions transmitted by the base computer consume data capacity on the transmission channel and also consume processing power in the user computer.

The wireless signal is preferably an infra-red signal. An advantage of such an arrangement, by comparison with an equivalent radio-only or an infra-red-only system, is that highly efficient protocols can be used and the communication throughput can be a increased (for example effectively doubled), because the RF and IR frequencies are not shared between the two directions of communication. Preferably, communication can be simultaneous in both directions.

An infra-red receiver in a user computer can be implemented with only a very few components, compared with many tens of components typically required for an RF receiver, and thus IR receivers are cheap, which is an advantage in the above scenario where there is one base computer and many user computers. Also, an IR receiver typically consumes considerably less power than an RF receiver, which produces another advantage in the above scenario, where the user computers preferably have low power consumption so that they can, for example, be battery powered. Furthermore, multi-path interference may be a problem at high data rates, and infra-red is likely to produce less multi-path interference than, say, radio, and therefore extraction of the data from the received signal in the user computer is simpler and requires less expensive hardware. An advantage of using radio from the user computer(s) to the base computer is that the power consumption of radio transmitters of an appropriate type is less than that of infra-red transmitters. It will be appreciated that with the arrangement according to this aspect of the invention, the power consumption of base computer will be high due to the use of infra-red, rather than radio, transmission. However, in most situations the base computer can conveniently be mains powered. It will also be appreciated that, at high data rates, the base computer may need to be able to cope with multi-path interference. However, this is not a great disadvantage compared with the disadvantage if many of the user computers each had to cope with that problem.

According to a second aspect of the present invention, there is provided a base computer per se for use as part of a network, comprising a processor, means by which data can be input to the processor, output from the processor and/or stored for use by the processor, means for transmitting data from the processor for supply to at least one user computer and means for receiving data from the user computer(s) for supply to the processor, wherein the transmitting means is operable to transmit data by way of a wireless signal and the receiving means is operable to receive data by way of a radio signal, and wherein the receiving means is operable to receive on any of a plurality of radio channels, the transmitting means is operable to transmit instructions via said wireless signal to the user computer(s) regarding the channel to be used, and the receiving means is operable to select one of the channels in accordance with the transmitted instructions.

According to a third aspect of the present invention, there is provided a user computer per se for use as part of a network, comprising a processor, means by which a user can input data to the processor and/or by which the processor can output data to the user, means for receiving data from a base computer for supply to the processor and means for transmitting data from the processor for supply to the base computer, wherein the receiving means is operable to receive data by way of a wireless signal and the transmitting means is operable to transmit data by way of a radio signal, and wherein the transmitting means is operable to transmit on any of a plurality of radio channels, the processor is operable to extract from the received data an instruction from the base computer regarding the channel to be used, and the transmitting means is operable to select one of the transmission channels in accordance with the received instruction.

According to a fourth aspect of the present invention, there is provided a computer network, comprising a base computer according to the second aspect of the invention and at least one user computer according to the third aspect of the invention.

According to a fifth aspect of the present invention, there is provided a method of networking a base computer and at least one user computer, comprising the steps of: transmitting data from the base computer to the user computer(s) by way of a wireless signal, transmitting data from the or each user computer to the base computer by way of a radio signal, and selecting radio channels for transmission by the or each user computer in accordance with instructions transmitted via said wireless signal to the user computers by the base computer.

Other preferred features of the invention are set forth in the appended claims.

BRIEF DESCRIPTION OF DRAWINGS

A specific embodiment of the present invention will now be described by way of example with reference to the accompanying drawings, in which.

BEST MODE FOR CARRYING OUT THE INVENTION & INDUSTRIAL APPLICABILITY

Figure 1:
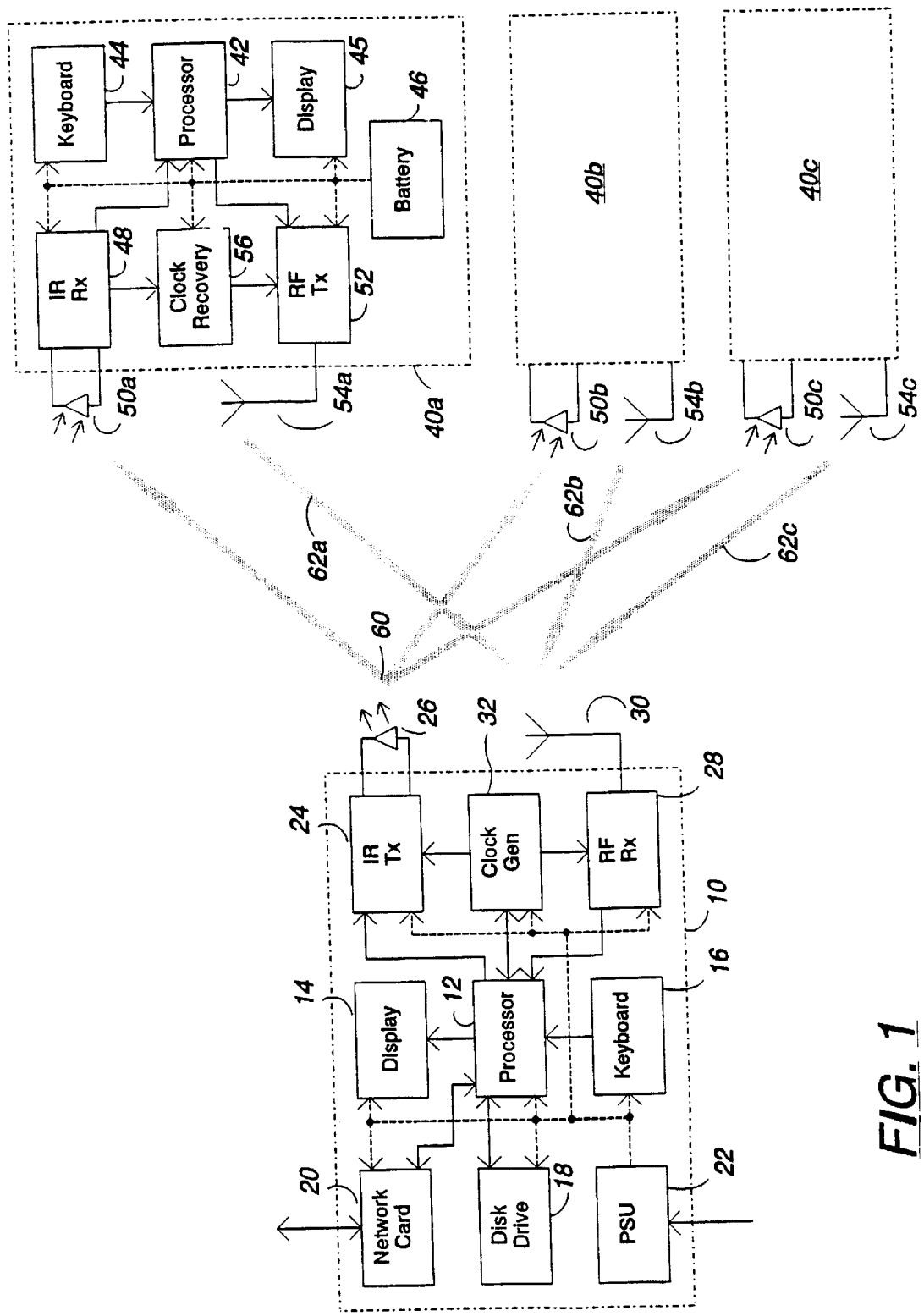
FIG. 1 is a block diagram of a computer network forming an embodiment of the invention.

Referring to FIG. 1, the computer network comprises a base station 10 and a plurality of remote units 40, of which, for simplicity, only three 40a, 40b, 40c are shown, and only one 40a is shown in detail.

The base station is based on a PC and comprises a motherboard having a processor 12 with associated read only and random access memory, a display 14 with an associated display adapter, a keyboard 16, one or more hard and/or floppy disk drives 18 with an associated disk controller, a network card 20 by which the base station can be connected by cable into a network of other computers and printers, and a mains power supply unit 22. Thus, in a conventional manner, data can be input to the processor 12 from the keyboard 16, disk drive 18 and network card 20; and data can be output from the processor 12 to the display 14, disk drive 18 and network card 20.

Additionally, the base station 10 has an infra-red transmitter 24 with an associated infra-red emitting diode 26, or bank of such diodes, by which data from the processor can be transmitted as a diffuse infra-red signal 60. Also included is a radio-frequency receiver 28 and associated antenna 30, by which radio signals 62a, 62b, 62c can be received and supplied to the processor. The transmitter 24 and receiver 28 are both clocked by a clock circuit 32.

The remote unit 40a is in the form of a notebook or palm-top computer and, as is conventional, comprises a processor 42 with associated read only and random access memory, a keyboard 44, a display 45 and a rechargeable battery 46.

Additionally, the remote unit 40a has an infra-red receiver 48 with an associated infra-red sensitive photodiode 50a or phototransistor, by which the infra-red signal 60 transmitted by the base station 10 can be received and supplied to the processor 42. Also included is a radio-frequency transmitter 52 and associated antenna 54a, by which data from the processor 42 can be transmitted as the radio signal 62a. The remote unit 40a also includes a clock recovery circuit 56 which can recover a clock signal from the data received by the receiver 48 and clock the data which is transmitted by the transmitter 52 accordingly.

One application for the network described above would be in a classroom, with the teacher having use of the base station and the students each having one of the remote units 40. In this case, each remote unit may have its photodiode 50 facing upwardly, or upwardly and forwardly, and the infra-red emitting diode 26 of the base station 10 may be located on the ceiling of the classroom, or at the top of the front wall of the classroom. Each of the photodiodes 50 may be mounted on its remote unit 40 by a pivotal or universal joint, or on a flexible stem, so that it can be adjusted to point directly at the infra-red emitting diode 26 of the base station 10.

Figure 2:
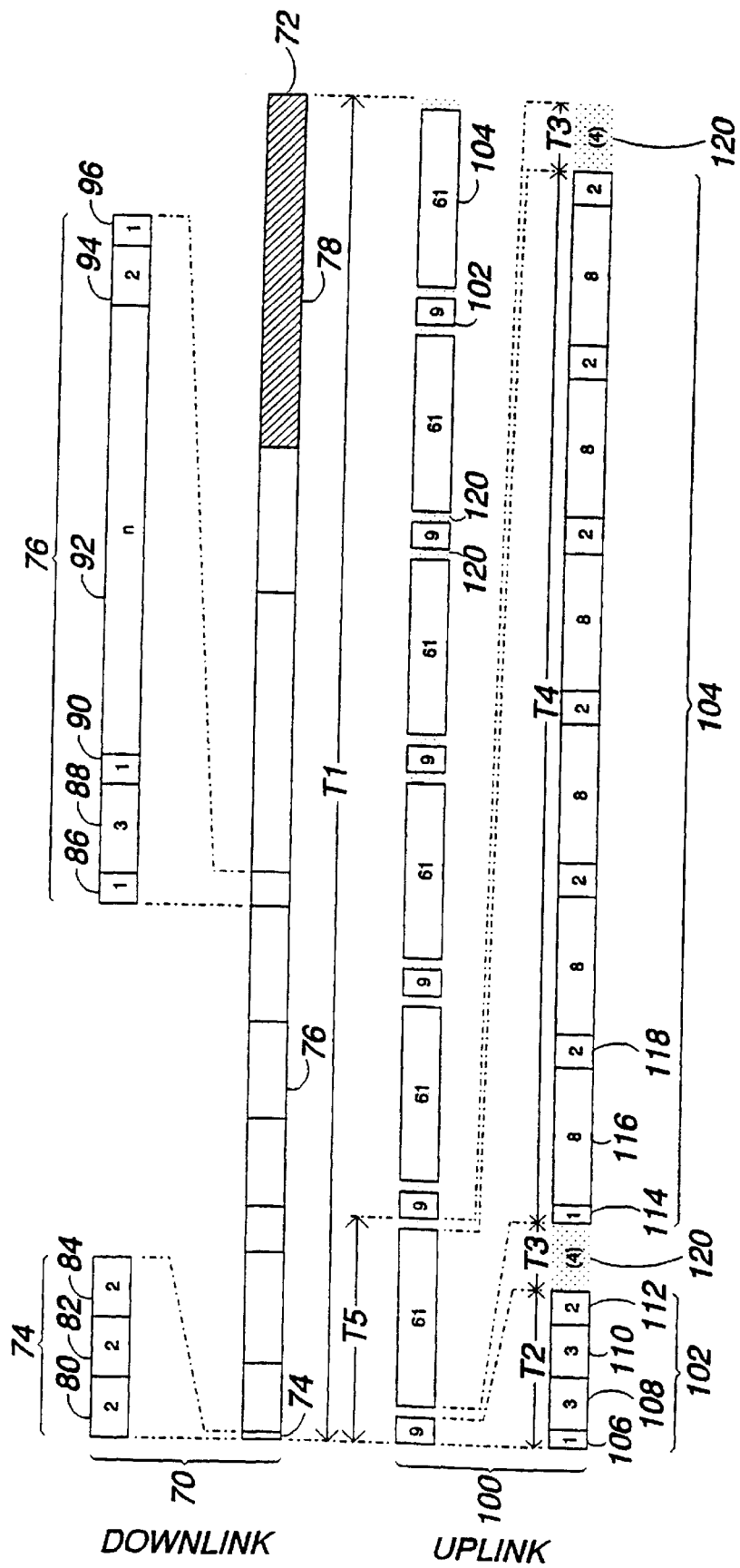
FIG. 2 is a diagram illustrating an example of the data format of the data transferred around the network.

Referring now also to FIG. 2, in an example of the network described above, infra-red data 70 from the base station 10 ("downlink data") is transmitted under the control of the clock 32 with a data rate of approximately 1.32 Mb/s (millions of bits per second) and in frames 72 having a frame period T1 of 5.6727 ms. Since the transmitted data is under the sole control of the base station, information can be transmitted in the information fields on demand. As shown in the second row in FIG. 2, each frame 72 is made up of a synchronisation sub-frame 74, a number of generic sub-frames 76, and a number of dummy bytes 78 to fill the frame.

As shown in the expanded portion at the left side of the top row in FIG. 2, the synchronisation sub-frame 74 is six bytes long and comprises a two byte synchronisation word 80, a two byte frame count field 82, and a two byte cyclic redundancy code (CRC) field 84. The synchronisation sub-frame 74 is provided so that the remote units 40 can synchronise to the base station 10, achieve clock recovery and obtain time reference information.

As shown in the expanded portion at the right side of the top row in FIG. 2, each generic sub-frame 76 is of variable length and comprises a one byte beginning flag 86, a three byte address field 88, a one byte control field 90, an optional information field 92 having an integer n number of bytes, a two byte frame check sequence 94, and a one byte ending flag 96. The generic sub-frames 76 are of three different types: page acknowledge; control; and message.

The page acknowledge sub-frames provide acknowledgements of random access pages transmitted from the remote units 40 to the base station 10 ("uplink"). They are transmitted as soon as possible as the page on the uplink has been received by the base station 10 so as to offer the best possible turn-around of request/acknowledgement cycles. As will be explained below, the downlink frame period T1 is greater than the uplink frame period, and there may be more than one page acknowledge sub-frame in a single downlink frame 72.

The control sub-frames provide packet allocation and frequency information for the uplink. The control sub-frame (s) is/are preferably sent at the beginning of each frame 72, so that a remote unit 40 can shut down until its packet arrival time, or until the next frame 72 starts, so as to conserve energy. A variable number of control sub-frames will be sent in each frame 72 depending on the real-time computed downlink traffic requirements.

The message sub-frames are of variable length, computed by the base station 10 to make optimum use of the frame. Each frame 72 will usually include many message sub-frames.

The dummy bytes 78 which fill each downlink frame 72 may each have the same value as the ending flags 96.

In each remote unit 40, the clock recovery circuit 56 processes the received data to derive the 1.32 Mb/s clock signal therefrom and produces a synchronised clock signal at half the rate, i.e. 660 kb/s, which is supplied to the RF transmitter 52 to clock the transmitted data 100 ("uplink data") at that rate, synchronised with the downlink data 70. The RF transmitter transmits in the 2.4 GHz ISM (industrial, scientific and medical) microwave band and is modulated using 2FSK (frequency shift keying) at the 660 kb/s data rate for the uplink data 100. The uplinks include control packets 102 and message packets 104, as shown in the third row in FIG. 2.

The control packets 102 employ slotted-ALOHA random-access paging of the base station 10. Each control packet 102 has a period T2 of 109.09 μs and contains nine bytes, comprising, as shown in the fourth row in FIG. 2, a one byte synchronisation field 106, a three byte field 108 for the ID of the remote unit, a three byte control message field 110, and a two byte CRC and error control field 112.

Because the uplink 100 is synchronous with the downlink 70, the uplink timing uncertainty is due to the two way propagation delay of the system (which in a 10 m room is typically 70 ns, i.e. about 4% of a bit period) plus the propagation delay uncertainties in the digital processing at the base station 10 and remote unit 40. Since the total uncertainty is likely to be small compared with one bit period, it is likely that it will not be necessary to recover a clock signal from the uplink data, but merely to set the dc level of the 2FSK discriminator. Accordingly, the synchronisation field 106 of the control packet 102 needs to be only one byte long.

In the control packet 102, the three byte control message field 110 can be used for the transport of short messages such as acknowledgements.

The traffic of uplink message packets 104 is dynamically reserved from the downlink. Each message packet 104 has a period T4 of 739.39 μs and contains 61 bytes. As shown in the fourth row of FIG. 2, each message packet 104 begins with a one byte synchronisation field 114 similar to the synchronisation fields 106 of the control packets 102. This is followed by 48 bytes of message data which is divided into six blocks 116 of eight byte data, each followed by a respective two byte CRC field 118.

As shown in the third and fourth rows in FIG. 2, between each control packet 102 and message packet 104, a guard band is provided having a period T3 of 48.485 μs, which equates to a transmission period for four bytes of data on the uplink. The guard bands are provided to enable the transmitters 52 to turn on and to enable frequency setting of their synthesisers. This therefore enables sequential control packets 102 and message packets 104 to be transmitted by different remote units 40 and at different frequencies.

As will be appreciated from FIG. 2, the period T5 for transmission of one control packet 102 and one message packet 104, together with the two associated guard bands 120, is T2+T4+2×T3=945.45 μs, and it will be furthermore appreciated that six such periods T5 occur within one downlink frame period T1, i.e. T1=6×T5.

In the arrangement described above, in order to comply with ISM band regulations and to provide some immunity to interference, the frequency of the RF transmissions on the uplink is changed in a pseudo-random manner amongst a number of predefined channels. All of the remote units 40 can continually and simultaneously listen to the base station 10, and therefore the base station can control the channels to be used by providing instructions in the control sub-frames 76 described above. Preferably, the base station also assesses the relative interference on the channels and instructs the use of channels on which there is no or little interference.

As an alternative to the above manner of transmitting channel allocation, the processor 12 in the base station 10 may control the clock generator 32 so that the data rate of the downlink is varied in accordance with the required uplink channel. Then, in each remote unit 40, the clock recovery circuit 56 not only recovers a clock signal from the received signal and derives an uplink clock signal therefrom, but also derives the required channel from the derived clock signal frequency and sets a frequency synthesiser in the RF transmitter 52 so that the uplink transmission channel is as instructed by the base station 10. This functionality can be provided by hardware of the clock recovery circuit 56 without consuming processor power of the processor 42 of the remote unit 40. It is also then unnecessary to devote space in the frames of data transmitted by the base station to channel instructions.

In the arrangement described above, in situations where the uplink is less reliable than the downlink, it is possible that on receiving a signal from the base station 10, the remote unit 40 will respond but will not be heard by the base station 10. The remote unit's unsuccessful reply, together with possibly many more unsuccessful attempts which it may make, will contribute to a level of interference which affects the other remote units 10 that can make successful replies, thus degrading the overall performance of the network. Therefore, the RF uplinks are preferably arranged so that they have a longer range than the IR downlink.

In a classroom scenario, there is unlikely to be any infra-red interference which might affect the signals transmitted from the base station 10 to the remote units 40. However, there may be microwave interference, notably if a nearby microwave oven were operated. Nevertheless, most microwave ovens have a 50% duty cycle at mains frequency. With the arrangement described above, the uplink message packet period T4 of 739.39 μs is substantially less than the interference free period (8.33 ms) of a 60 Hz powered microwave oven having a 50% duty cycle. Accordingly, such interference may reduce the rate of reception of good data, but will not completely prevent it.

It will be appreciated that many modifications and developments may be made to the embodiment of the invention described above. The specific description of the embodiment is therefore not to be taken as limiting the scope of the invention.

I claim:

1. A computer network comprising a base computer, at least one user computer and a bidirectional communications link between the base computer and the user computer, wherein the link from the base computer to the user computer is by way of an infra-red signal and the link from the user computer to the base computer is by way of a radio signal, wherein the base computer is operable to transmit data by way of the infra-red signal at the same time as the user computer transmits data by way of the radio signal, and wherein the user computer is operable to transmit on any of a plurality of radio channels, the base computer is operable to transmit instructions via said infra-red signal to the user computer regarding the channel to be used, and the user computer is operable to select one of the transmission channels in accordance with the received instructions.

2. A network as claimed in claim 1, wherein the user computer is operable to transmit on any of a plurality of radio channels; the base computer is operable to transmit with a data rate which is variable; and the user computer is operable to select one of the transmission channels in accordance with the data rate of the received wireless signal.

3. A base computer for use as part of a network, comprising a processor, means by which data can be input to the processor, output from the processor and/or stored for use by the processor, means for transmitting data from the processor for supply to at least one user computer and means for receiving data from the user computer(s) for supply to the processor, wherein the transmitting means is operable to transmit data by way of an infra-red signal and the receiving means is operable to receive data by way of a radio signal, wherein the base computer is operable to transmit data by way of the infra-red signal at the same time as the user computer transmits data by way of the radio signal, and wherein the receiving means is operable to receive on any of a plurality of radio channels, the transmitting means is operable to transmit instructions via said infra-red signal to the user computer regarding the channel to be used, and the receiving means is operable to select one of the channels in accordance with the transmitted instructions.

4. A computer as claimed in claim 3, wherein the receiving means is operable to receive on any of a plurality of radio channels; the base computer is operable to transmit with a data rate which is variable; and the receiving means is operable to select one of the channels in accordance with the data rate of transmission.

5. A computer as claimed in claim 3, wherein the transmitting means is operable to transmit data at a transmit data rate, and the receiving means is operable to sample received data at a receive data rate which is synchronised with the transmit data rate.

6. A user computer for use as part of a network, comprising a processor, means by which a user can input data to the processor and/or by which the processor can output data to the user, means for receiving data from a base computer for supply to the processor and means for transmitting data from the processor for supply to the base computer, wherein the receiving means is operable to receive data by way of an infra-red signal and the transmitting means is operable to transmit data by way of a radio signal, wherein the base computer is operable to transmit data by way of the infra-red signal at the same time as the user computer transmits data by way of the radio signal, and wherein the transmitting means is operable to transmit on any of a plurality of radio channels, the processor is operable to extract from the received data an instruction from the base computer regarding the channel to be used, and the transmitting means is operable to select one of the transmission channels in accordance with the received instruction.

7. A computer as claimed in claim 6, wherein the transmitting means is operable to transmit on any of a plurality of radio channels and to select one of the transmission channels in accordance with a data rate of the received wireless signal.

8. A computer as claimed in claim 6, further comprising means for recovering a clock signal from the received data and for clocking the transmitting means in accordance with the recovered clock signal.

9. A computer as claimed in claim 6, which is powered by a battery.

10. A computer as claimed in claim 6, which is portable.

11. A method of networking a base computer and at least one user computer, comprising the steps of:

transmitting data from the base computer to the user computer by way of an infra-red signal, transmitting data from the user computer to the base computer by way of a radio signal, the base computer being operable to transmit data by way of the infra-red signal at the same time as the user computer transmits data by way of the radio signal, and selecting radio channels for transmission by the user computer in accordance with instructions transmitted via said wireless signal to the user computers by the base computer.

12. A method as claimed in claim 11, wherein radio channels for transmission by the user computer are selected in accordance with the rate of data transmitted by the base computer.

13. A method as claimed in claim 11, wherein the user computer is operable to perform the steps of recovering a clock signal from the data received from the base computer and clocking the data transmitted from that user computer to the base computer in accordance with the recovered clock signal.

* * * * *